United States Patent
Kiiski et al.

(10) Patent No.: US 11,377,608 B2
(45) Date of Patent: Jul. 5, 2022

(54) PREPARATION OF AN AVIATION FUEL COMPOSITION

(71) Applicant: Neste Oyj, Espoo (FI)

(72) Inventors: Ulla Kiiski, Porvoo (FI); Jenni Nortio, Porvoo (FI); Kati Sandberg, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 16/958,406

(22) PCT Filed: Dec. 21, 2018

(86) PCT No.: PCT/FI2018/050972
§ 371 (c)(1),
(2) Date: Jun. 26, 2020

(87) PCT Pub. No.: WO2019/129928
PCT Pub. Date: Apr. 7, 2019

(65) Prior Publication Data
US 2021/0054297 A1    Feb. 25, 2021

(30) Foreign Application Priority Data
Dec. 28, 2017 (FI) .................. 20176177

(51) Int. Cl.
| C10G 11/02 | (2006.01) |
| C10G 11/05 | (2006.01) |
| C10G 67/06 | (2006.01) |
| C10G 69/04 | (2006.01) |
| C10G 3/00 | (2006.01) |

(52) U.S. Cl.
CPC .............. *C10G 69/04* (2013.01); *C10G 3/44* (2013.01); *C10G 11/02* (2013.01); *C10G 2300/1007* (2013.01); *C10G 2300/1014* (2013.01); *C10G 2300/1018* (2013.01); *C10G 2400/08* (2013.01)

(58) Field of Classification Search
CPC . C10G 3/44; C10G 3/57; C10G 11/02; C10G 11/05; C10G 67/06; C10G 69/04; C10G 2300/1014; C10G 2300/1018; C10G 2400/08
See application file for complete search history.

(56) References Cited

U.S. PATENT DOCUMENTS

| 9,476,002 B1 | 10/2016 | Schuetzle et al. |
| 2003/0085153 A1 | 5/2003 | Orear |
| 2008/0092436 A1 | 4/2008 | Seames et al. |
| 2012/0289752 A1 | 11/2012 | Gosselink et al. |
| 2013/0055624 A1* | 3/2013 | Vidal Vieira ............ C11B 3/12 44/386 |
| 2014/0135542 A1 | 5/2014 | Liang et al. |
| 2015/0112106 A1 | 4/2015 | Rockwell et al. |
| 2017/0183593 A1* | 6/2017 | Sandberg ................. C10G 3/46 |

FOREIGN PATENT DOCUMENTS

| EP | 3187567 A1 | 7/2017 |
| EP | 2981594 B1 | 11/2017 |
| FR | 2937647 A1 * | 4/2010 ............ C10G 45/02 |
| FR | 2937647 A1 | 4/2010 |
| WO | 2017114715 A1 | 7/2017 |

OTHER PUBLICATIONS

International Preliminary Report on Patentability issued in corresponding International Patent Application No. PCT/FI2018/050972, 24 pages (dated Jan. 23, 2020).
International Search Report and Written Opinion issued in corresponding International Patent Application No. PCT/FI2018/050972, 10 pages (dated Feb. 22, 2019).
Search Report issued in corresponding FINNISH Patent Application No. FI 20176177, 2 pages (dated April 23, 2018).
Edwards, J.T., et al., U.S. Airforce hydroprocessed renewable jet (HRJ) fuel research. In; Interim Report: AFRL-RQ-WP-TR-2013-0108, p. 1, lines 1-18; Tables 24 and 25, pp. 23-27, (Jul. 2012).
Notification of the Second Office Action for Chinese Application No. 2018800840195 dated Mar. 2, 2022.
Notification of the Second Office Action for Chinese Application No. 2018800840195 dated Mar. 2, 2022 (English Translation).

* cited by examiner

*Primary Examiner* — Randy Boyer
(74) *Attorney, Agent, or Firm* — Buchanan Ingersoll & Rooney PC

(57) ABSTRACT

A method is disclosed for preparing an aviation fuel composition by subjecting a feedstock of biological and/or recycled origin to cracking in a cracking unit and to fractionation in a fractionation unit to obtain a kerosene fraction. The obtained kerosene fraction is subjected to hydrotreatment in a hydrotreatment unit to form a first jet fuel component. The formed first jet fuel component is mixed with a further jet fuel component to form a fuel composition having a wear scar diameter of 0.78 mm or less, as measured with BOCLE lubricity test method according to ASTM D5001. The feedstock contains one or more of tall oil pitch (TOP), a mixture of sludge palm oil, palm fatty acid distillate and animal fat (FATS), and used lubricant oil (ULO).

20 Claims, 1 Drawing Sheet

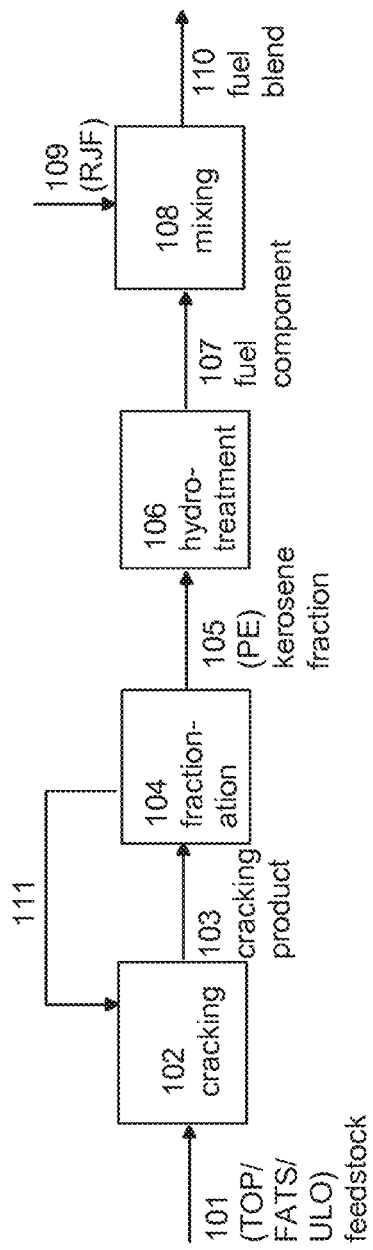

PREPARATION OF AN AVIATION FUEL COMPOSITION

FIELD OF THE INVENTION

The invention relates to an aviation fuel composition, and more particularly to a method for preparing the aviation fuel composition.

BACKGROUND

The following background description art may include insights, discoveries, understandings or disclosures, or associations together with disclosures not known to the relevant art prior to the present invention but provided by the present disclosure. Some such contributions disclosed herein may be specifically pointed out below, whereas other such contributions encompassed by the present disclosure the invention will be apparent from their context.

Renewable aviation fuel demand is expected to grow in the future due to global initiatives to decrease emissions of greenhouse gases (GHG) such as $CO_2$. One possibility to decrease greenhouse gas emissions is to increase the use of renewable fuels in preparation of aviation fuels. Renewable jet fuel (RJF) derived from biomass, such as plants, trees, algae, waste and other organic matter bio-oils, offers an opportunity to reduce these emissions.

There are different types of aviation fuels which are strictly specified in various standards. The strict requirements in part restrict the modification of the aviation fuels by means of other fuel components.

SUMMARY

According to an aspect, there is provided the subject matter of the independent claims. Embodiments are defined in the dependent claims.

One or more examples of implementations are set forth in more detail in the detailed description below. Other features will be apparent from the description and from the claims.

BRIEF DESCRIPTION OF THE DRAWINGS

In the following the invention will be described in greater detail by means of preferred embodiments with reference to the attached drawing, in which FIG. 1 illustrates an exemplary process for preparation of an aviation fuel composition.

DETAILED DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising", "containing" and "including" should be understood as not limiting the described embodiments to consist of only those features that have been mentioned and such embodiments may contain also features/structures that have not been specifically mentioned.

In oil refinery processes, cracking refers to a decomposition process induced by an elevated temperature (>350° C.), wherein higher molecular weight constituents are converted to lower molecular weight products. Cracking reactions involve carbon-carbon bond rupture. During the actual cracking process, some smaller molecules may combine to give a product of higher molecular weight.

Cracking, such as catalytic cracking, is a process in an oil refinery used for cleaving larger hydrocarbon components into smaller short-chain hydrocarbons which are usable as traffic fuel components. Cracking is achieved by breaking the carbon-carbon bonds in the hydrocarbon chains typically in the presence of a cracking catalyst. The nature of the end products is dependent on the nature of the feed and on the process conditions under which the process is carried out, such as temperature, pressure and the nature of the catalyst.

A widely used method for carrying out catalytic cracking of high-boiling, high-molecular weight hydrocarbon fractions of petroleum crude oils is a fluid catalytic cracking (FCC) process, in which a powdered catalyst is employed. The catalyst particles are suspended in a rising flow of a heavy gas oil feed to form a fluidized bed. The feed is typically pre-heated and then sprayed into a base of the riser via feed nozzles to bring the feed in contact with the hot fluidized catalyst. The temperature of a FCC cracker is typically between 500° C. and 800° C.

Another type of catalytic cracking utilizes a thermal catalytic cracker (TCC). The operation of a TCC unit is well known in the art. In a typical TCC unit, the preheated feedstock flows by gravity through the catalytic reactor bed. The vapors are separated from the catalyst and sent to a fractionating tower. The spent catalyst is regenerated, cooled, and recycled. The flue gas from regeneration is sent to a carbon monoxide boiler for heat recovery. Catalyst used in a TCC unit is typically an amorphous silica-alumina catalyst, and the temperature in the thermal catalytic cracking unit is typically from 400° C. to 650° C.

Aircraft and engine fuel system components and fuel control units rely on the fuel to lubricate their moving parts. Lubricity of an aviation fuel (jet fuel) is defined in a UK aviation fuel standard specification DEF STAN 91-091. Lubricity of aviation kerosene type fuel is limited by the DEF STAN 91-091 standard to a maximum wear scar diameter of 0.85 mm as measured with an ASTM D5001 test method called BOCLE (ball on cylinder lubricity evaluator). The requirement to measure lubricity is applied whenever synthesized fuel components are used in a final fuel blend. Fuel lubricity is important especially in military use.

An embodiment enables improving fuel lubricity without lubricity improver additive(s). An embodiment also enables up-grading the lubricity of poorly lubricating fuel components.

In an embodiment, a feedstock is provided. The feedstock is of renewable and/or recycled origin, and comprises tall oil pitch (TOP), a mixture of sludge palm oil, palm fatty acid distillate and animal fat (FATS), used lubricant oil (ULO), or any mixture thereof. The feedstock is cracked to obtain a cracking product. The cracking product is fractionated to obtain a kerosene fraction having a distillation range of 145° C. to 300° C., preferably 170° C. to 240° C. The kerosene fraction is hydrotreated in order to obtain a first jet fuel component of biological and/or recycled origin. The obtained first jet fuel component is blended with a further jet fuel component in order to obtain a jet fuel composition having an improved lubricity compared to the neat components. The further jet fuel component used may be e.g. a renewable jet fuel component, a GTL based jet fuel component or a petroleum derived jet fuel component.

In a preferred embodiment the further jet fuel component is renewable jet fuel component of biological and/or recycled origin.

Thus in an embodiment, aviation fuel lubricity may be improved, thus reducing or eliminating the use of lubricity additive(s). For example, in military aviation, the use of lubricity additive(s) may be reduced or even totally eliminated.

In an embodiment, feedstock for obtaining a renewable jet fuel (RJF) component comprises feeds containing glycerides or fatty acids, preferably comprising vegetable oil, animal fat, fish fat, fish oil, algae oil, microbial oil and/or wood and/or other plant based oil, or recyclable waste and/or residue thereof or any combination thereof. Recyclable waste comprises material such as used cooking oil, free fatty acids, palm oil side streams, sludge, and side steams from vegetable oil processing.

Renewable fuel refers to biofuel produced from biological resources formed through contemporary biological processes. The renewable jet fuel component may be produced by means of a hydrotreatment process. Hydrotreatment involves various reactions where molecular hydrogen reacts with other components, or the components undergo molecular conversions in the presence of molecular hydrogen and a solid catalyst. The reactions include, but are not limited to, hydrogenation, hydrodeoxygenation, hydrodesulfurization, hydrodenitrification, hydrodemetallization, hydrocracking, and isomerization. The renewable jet fuel component may have different distillation ranges which provide the desired properties to the component, depending on the intended use.

Renewable jet fuel component typically comprises i-paraffins and nparaffins, and only a minor amount of other compounds. In the renewable jet fuel component, the amount of i-paraffins is typically more than about 50 wt-%, more than about 70 wt-%, or more than about 90 wt-%. Typically the amount of C15 to C18 paraffins in the renewable jet fuel component is more than about 70 wt-%, more than about 85 wt-%, or more than about 90 wt-%. In the renewable jet fuel component, the amount of paraffins smaller than C15 paraffins is typically less than about 20 wt-%, less than about 10 wt-%, or less than about 7 wt-%. In the renewable jet fuel component, the amount of paraffins larger than C18 paraffins is typically less than about 10 wt-%, less than about 5 wt-%, or less than about 3 wt-%. The amounts of C15, C16, C17 and C18 hydrocarbons may vary in the renewable jet fuel component.

FIG. 1 shows an embodiment of the process for producing an aviation fuel composition. In FIG. 1, a feedstock stream 101 comprising tall oil pitch (TOP), a mixture of sludge palm oil, palm fatty acid distillate and animal fat (FATS), used lubricant oil (ULO), or any mixture thereof, is fed to a cracking unit (such as a catalytic cracking unit) 102 where the feedstock is cracked. Before the catalytic cracking, the feedstock 101 may be subjected to pretreatment e.g. by adsorption, treatment with an ion exchange resin, heat treatment, distillation and/or washing (not shown in FIG. 1). The temperature used to perform the cracking is from 400° C. to 800° C., preferably from 500° C. to 800° C. when operating a FCC unit, and preferably 400° C. to 650° C. when operating a TCC unit. The cracking product stream 103 is fed to a distillation column 104 for fractionation, wherein fractions are directed to a distillation bottom recycle stream 111, or recovered as a kerosene fraction 105. The kerosene fraction 105 is further fed to a hydrotreatment unit 106 to subject the stream 105 to e.g. hydrodesulphurisation, isomerization, and/or hydrodeoxygenation. The hydrotreatment may be performed at a temperature from 200° C. to 400° C., and/or at a pressure of 20 to 150 bar. A first jet fuel component 107 is thus obtained. A further jet fuel component 109 is mixed with the first jet fuel component 107 in a blending unit 108 (renewable/recycled component pool 108) to form a fuel blend (aviation fuel composition) 110 which has a wear scar diameter of 0.78 mm or less, as measured with BOCLE lubricity test method according to ASTM D5001. The formed fuel blend 110 may contain from 85 to 95 wt % of further jet fuel component 109, and from 5 to 15 wt-% of first jet fuel component 107 originating from at least one of: tall oil pitch (TOP), a mixture of sludge palm oil, palm fatty acid distillate and animal fat (FATS), and used lubricant oil (ULO). The further jet fuel component 109 is preferably renewable jet fuel (RJF) and the formed fuel blend 110 may be further blended with fossil fuel (not shown in FIG. 1).

In one embodiment, the kerosene fraction 105 has a distillation range from 145° C. to 300° C., preferably from 150° C. to 270° C., preferably from 170° C. to 240° C.

In one embodiment, the cracking comprises thermofor catalytic cracking (TCC). This method is less sensitive for varying feedstock materials.

In an embodiment, the cracking comprises fluid catalytic cracking (FCC) which is a widely used technique.

In one embodiment, the feedstock 101 for obtaining the first jet fuel component comprises TOP and/or FATS which are readily available and acknowledged waste material of biological origin.

In one embodiment, the feedstock 101 for obtaining the first jet fuel component comprises used lubricating oil (ULO) which is recycled waste material.

In one embodiment, the method further comprises subjecting the kerosene fraction 105 to hydrotreatment 106, preferably to hydrodesulphurisation and/or hydrodeoxygenation, before mixing the first jet fuel component 107 and the further jet fuel component 109 together.

In one embodiment, the hydrotreatment 106 is performed at a temperature from 200° C. to 400° C. and at a pressure from 20 to 150 bar.

In one embodiment, the method further comprises subjecting the kerosene fraction 105/the first jet fuel component 107 to isomerization before mixing the first jet fuel component 107 and the further jet fuel component 109 together.

In one embodiment, the wear scar diameter of the fuel blend is lower than the wear scar diameter of the first jet fuel component or the wear scar diameter of the further jet fuel component, as measured according to the DEF STAN 91-091 standard which is a standard test method for determining the lubricity of fuels.

In one embodiment, the wear scar diameter of the fuel blend 110 is at least 0.02 mm lower, preferably at least 0.04 mm lower, than the wear scar diameter of the first jet fuel component 107 or the wear scar diameter of the further jet fuel component 109.

In one embodiment, the catalyst in the catalytic cracking 102 comprises aluminium based catalyst, lanthanum based catalyst, titanium based catalyst, silicon based catalyst and/or zeolite based catalyst.

In one embodiment, the temperature in the cracking 102 is from 480° C. to 580° C., preferably from 510° C. to 550° C.

In one embodiment, the method further comprises subjecting the feedstock 101 to pretreatment, such as selective pretreatment depending on the quality of the feedstock material and the type of impurity. Preferably feedstock of renewable or recycled origin is pretreated before the catalytic cracking by at least one of adsorption, treatment with an ion exchange resin, washing, heat treatment, or distillation.

In one embodiment, the method further comprises subjecting the cracked feedstock 103 to fractionation by distillation for selecting a suitable or desired boiling point fraction, preferably within the selected specification.

An aviation fuel blend 110 produced by the method is disclosed. The aviation fuel blend 110 comprises from 5 to 15 wt-% of first jet fuel component 107 originating from TOP, FATS and/or ULO, and from 85 to 95 wt-% of further jet fuel component 109.

In an embodiment, the aviation fuel blend 110 may be used for improving the lubricity of a fuel composition comprising fossil fuel.

Renewable fuel refers to a biomass-derived fuel oil, a fuel oil prepared from the conversion of biomass. Herein aviation fuel refers to transportation fuels which are fractions or cuts of hydrocarbons, and preferably have a distillation range (boiling point range) typical for aviation fuel (e.g. 145° C.-300° C., such as 170° C.-240° C.).

Renewable feedstock of biological origin or recycled feedstock is utilized in the process. Tall oil pitch (TOP) is a non-volatile fraction that is obtained in crude tall oil vacuum distillation. Tall oil is lignocellulosic raw material oil obtained as a by-product from a pulp process of wood material. It comprises a varying mixture of resin acids, fatty acids, neutral materials, i.e. mainly sterols, and esters of these alcohols and acids. Tall oil is generally refined by distillation at a low pressure. Primary oil, fatty acids and resin acids are recovered as overhead of the distillation, and TOP is generated as a distillation residue.

TOP comprises in itself alcohol esters of fatty and resin acids, oligomers of fatty and resin acids, phytosterols, high-boiling neutral matters such as spirits, hydrocarbons, etc. The use of TOP is limited, firstly by its high viscosity (3000 cP/50° C.), and secondly, by the fact that TOP is seldom totally in solid form. Consequently, it is used in flaming torches and outdoor fire pots and similar applications. Additionally it is used as a binder in cement, an adhesive, and an emulsifier for asphalt.

In an embodiment, TOP, FATS or ULO 101 is combined with RJF 109.

TOP PE, FATS PE and ULO PE refer to kerosene fractions 105 obtained by cracking and fractionating the TOP, FATS and ULO feedstocks 101, respectively.

An embodiment enables obtaining a BOCLE lubricity of the blend 110, which better than that for neat components 107, 109. This may also be utilized in blending of fossil based hydroprocessed components which might impair the lubricity of aviation kerosene pool. Natural lubricity of the components and synergistic behavior enable minimizing or even avoiding the lubricity additive. In military specifications MIL-DTL-83133, MIL-DTL-5624, DEF STAN 91-87 and DEF STAN 91-86, the use of lubricity additive is mandatory.

Example 1

In accordance with the scheme depicted in FIG. 1, tall oil pitch (TOP), a mixture of sludge palm oil, palm fatty acid distillate and animal fat (FATS), and used lubricant oil (ULO) were cracked and then distilled to kerosene fractions (TOP PE, FATS PE, ULO PE) followed by hydrotreatment. The hydrotreated kerosene fractions were mixed with renewable jet fuel (RJF) to obtain the fuel blends, and the BOCLE lubricities were measured with the ASTM D5001 (2014) test method. The obtained BOCLE test results are presented in Tables 1, 2 and 3. As can be seen from Tables 1, 2 and 3, the BOCLE lubricities of the blends were better than those for components.

TABLE 1

RJF blend with hydrotreated TOP PE

| Fuel blend | Wear scar diameter (mm) as measured with BOCLE test method (ASTM D5001) |
|---|---|
| 100 wt-% RJF | 0.82 |
| 95 wt-% RJF + 5 wt-% TOP PE | 0.73 |
| 85 wt-% RJF + 15 wt-% TOP PE | 0.75 |
| 100 wt-% TOP PE | 0.82 |

TABLE 2

RJF blend with hydrotreated FATS PE

| Fuel blend | Wear scar diameter (mm) as measured with BOCLE test method (ASTM D5001) |
|---|---|
| 100 wt-% RJF | 0.82 |
| 95 wt-% RJF + 5 wt-% FATS PE | 0.74 |
| 85 wt-% RJF + 15 wt-% FATS PE | 0.78 |
| 100 wt-% FATS PE | 0.85 |

TABLE 3

RJF blend with hydrotreated ULO PE

| Fuel blend | Wear scar diameter (mm) as measured with BOCLE test method (ASTM D5001) |
|---|---|
| 100 wt-% RJF | 0.82 |
| 95 wt-% RJF + 5 wt-% ULO PE | 0.74 |
| 85 wt-% RJF + 15 wt-% ULO PE | 0.76 |
| 100 wt-% ULO PE | 0.80 |

Example 2

TOP and FATS were pretreated by heat treatment followed by filtration. Used lubricant oil used in cracking was distillated with a wiped film/short path distillation plant.

Thermofor catalytic cracking (TCC) was conducted in a TCC reactor. The processed feeds were tall oil pitch (TOP), a FATS mixture (70 wt-% of animal fat, 24 wt-% of sludge palm oil, and 6-wt % of palm fatty acid distillate), and used lubricant oil (ULO). The TCC reactor was operated at 530° C. under atmospheric pressure with WHSV set to 0.3 l/h. The reactor was filled with TCC catalyst (silicon aluminium oxide, 3 mm-5 mm).

The liquid product obtained from TCC cracking was distilled into gasoline, kerosene, light gas oil, gas oil, cycle oil and bottom oil cuts. Kerosene fraction (PE) with distillation range 170° C.-240° C. was then further processed by hydrodesulphurization.

Hydrodesulphurization (HDS) was performed using a sulfided NiMO/AL2O3 catalyst and the reactor was operated at temperature 350° C., pressure 45 bar and WHSV about 1.5 l/h. After hydrodesulphurization, the obtained fuel components were analyzed by using a test method according to the ASTM D2425-04 standard. The analysis results are presented in Table 4.

TABLE 4

Properties of jet fuel components

| Method | Property | TOP jet fuel | FATS jet fuel | ULO jet fuel |
|---|---|---|---|---|
| ASTM D2425-04 | Saturated | 45.7 wt-% | 70.4 wt-% | 55.1 wt-% |
| ASTM D2425-04 | Paraffins | 17.4 wt-% | 46.5 wt-% | 33.7 wt-% |
| ASTM D2425-04 | Cycloparaffins | 28.3 wt-% | 23.9 wt-% | 21.4 wt-% |
| ASTM D2425-04 | Aromatics | 54.3 wt-% | 29.6 wt-% | 44.9 wt-% |

FATS jet fuel had the highest saturated hydrocarbons content, ULO jet fuel had the second highest saturated hydrocarbons content, and TOP jet fuel had the lowest saturated hydrocarbons content. Saturated hydrocarbons in FATS and ULO jet fuel comprise more paraffins than cycloparaffins. TOP jet fuel saturated hydrocarbons comprise more cycloparaffins than paraffins. Aromatic content of samples decreased in order: TOP>ULO>FATS.

It will be obvious to a person skilled in the art that, as the technology advances, the inventive concept can be implemented in various ways. The invention and its embodiments are not limited to the examples described above but may vary within the scope of the claims.

The invention claimed is:

1. A method for preparing an aviation fuel composition, the method comprising:
   subjecting a feedstock of biological and/or recycled origin to cracking in a cracking unit and to fractionation in a fractionation unit to obtain a kerosene fraction;
   subjecting the obtained kerosene fraction to hydrotreatment in a hydrotreatment unit to form a first jet fuel component;
   forming a fuel composition having a wear scar diameter of 0.78 mm or less, as measured with BOCLE lubricity test method according to ASTM D5001, by mixing the formed first jet fuel component with a further jet fuel component, such that the wear scar diameter measured for the fuel composition is at least 0.04 mm lower than the wear scar diameter obtained based on the first jet fuel component and the further jet fuel component, and such that the fuel composition contains from 5 wt-% to 15 wt-% of the first jet fuel component and from 85 wt-% to 95 wt-% of the further jet fuel component;
   wherein the feedstock contains one or more of:
   tall oil pitch (TOP),
   a mixture of sludge palm oil, palm fatty acid distillate and animal fat (FATS), or
   used lubricant oil (ULO);
   wherein the first jet fuel component is obtained from at least one or more of:
   a kerosene fraction (TOP PE) derived from tall oil pitch (TOP),
   a kerosene fraction (FATS PE) derived from a mixture of sludge palm oil, palm fatty acid distillate and animal fat (FATS), or
   a kerosene fraction (ULO PE) derived from used lubricant oil (ULO).

2. The method as claimed in claim 1, wherein the further jet fuel component comprises:
   a renewable jet fuel, or
   wherein the further jet fuel component is a renewable jet fuel component.

3. The method as claimed in claim 1, wherein the wear scar diameter of the fuel composition is lowered compared to the wear scar diameter of the first jet fuel component of the fuel composition and compared to the wear scar diameter of the further jet fuel component, as measured according to an ASTM D5001 standard.

4. The method as claimed in claim 1, wherein the first jet fuel component is obtained from a kerosene fraction (TOP PE) derived from tall oil pitch (TOP), wherein the formed fuel composition has a wear scar diameter of 0.75 mm or less, as measured according to ASTM D5001.

5. The method as claimed in claim 1, wherein the first jet fuel component is obtained from a kerosene fraction (FATS PE) derived from a mixture of sludge palm oil, palm fatty acid distillate and animal fat (FATS), wherein the formed fuel composition has a wear scar diameter of 0.78 mm or less, as measured according to ASTM D5001.

6. The method as claimed in claim 1, wherein the first jet fuel component is obtained from a kerosene fraction (ULO PE) derived from used lubricant oil (ULO), wherein the formed fuel composition has a wear scar diameter of 0.76 mm or less, as measured according to ASTM D5001.

7. The method as claimed in claim 1, wherein the kerosene fraction has a distillation range from 145° C. to 300° C.

8. The method as claimed in claim 1, wherein the cracking comprises:
   catalytic cracking by at least one of thermofor catalytic cracking (TCC), or fluid catalytic cracking (FCC).

9. The method as claimed in claim 1, wherein the hydrotreatment is performed at a temperature from 200° C. to 400° C. and at a pressure from 20 bar to 150 bar in a presence of a hydrotreatment catalyst.

10. The method as claimed in claim 1, wherein the method comprises:
    subjecting cracked feedstock to fractionation by distillation.

11. The method as claimed in claim 1, wherein the method comprises:
    subjecting the kerosene fraction to isomerization.

12. The method as claimed in claim 8, wherein the catalyst in the catalytic cracking comprises at least one or more of:
    aluminium based catalyst, lanthanum based catalyst, titanium based catalyst, silicon based catalyst or zeolite based catalyst.

13. The method as claimed in claim 9, wherein the temperature in the catalytic cracking is from 480° C. to 580° C.

14. The method as claimed in claim 1, wherein the method comprises:
    subjecting the feedstock to pretreatment before the cracking by at least one or more of:
    adsorption, treatment with an ion exchange resin, washing, heat treatment, or distillation.

15. The method as claimed in claim 1, wherein the kerosene fraction has a distillation range from 150° C. to 270° C.

16. The method as claimed in claim 1, wherein the kerosene fraction has a distillation range from 170° C. to 240° C.

17. The method as claimed in claim 11, wherein the temperature in the catalytic cracking is from 510° C. to 550° C.

18. The method as claimed in claim 4, wherein the formed fuel composition has a wear scar diameter of 0.73 mm, as measured according to ASTM D5001.

19. The method as claimed in claim 5, wherein the formed fuel composition has a wear scar diameter of 0.74 mm, as measured according to ASTM D5001.

20. The method as claimed in claim 6, wherein the formed fuel composition has a wear scar diameter of 0.74 mm, as measured according to ASTM D5001.

\* \* \* \* \*